March 11, 1930. H. D. GEYER 1,750,302
MOLDED COMPOSITION ARTICLE
Filed Oct. 3, 1927
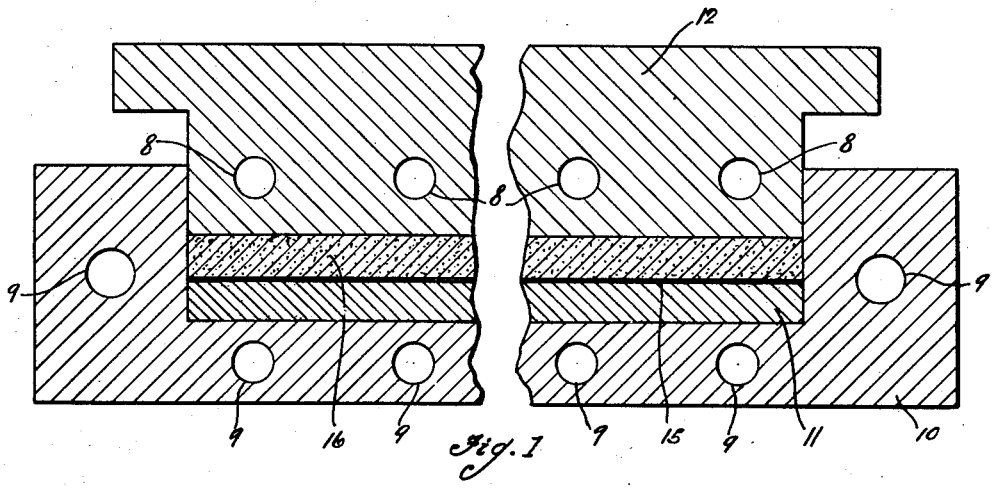
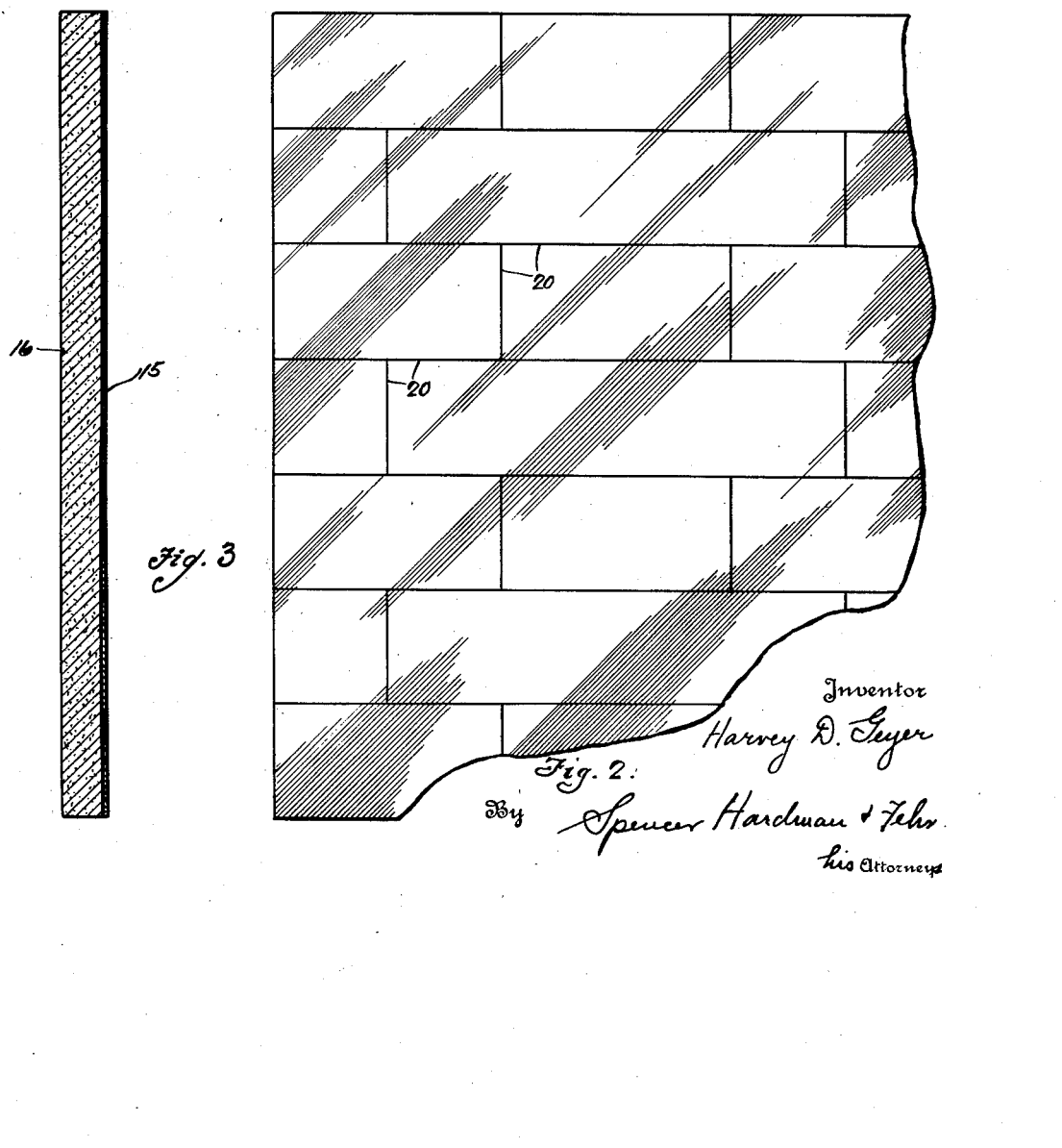
Inventor
Harvey D. Geyer
By Spencer Hardman & Fehr
his Attorneys Patented Mar. 11, 1930

1,750,302

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

MOLDED COMPOSITION ARTICLE

Application filed October 3, 1927. Serial No. 223,500.

This invention relates to articles molded from a bituminous compound but having a relatively thin hard outer covering of phenolic condensation products molded and cured thereupon.

An object of this invention is to provide molded articles of bituminous materials but having a thin, smooth, hard, polished surface of phenolic condensation products such as bakelite, or other similar moldable material which is rendered hard and insoluble by heat and pressure.

In my copending application, Serial No. 169,669, filed Feb. 19, 1927, there is described and claimed a bituminous compound and process for molding articles therefrom, such as ice-cream cabinet lids and doors and panels for building up cabinets of various kinds, especially refrigerator cabinets where moisture resisting properties are important.

By this present invention molded articles may be produced consisting chiefly of the same or similar bituminous compounds described in said prior application but having a hard, smooth, relatively thin, outer casing of bakelite, condensite, durez, or similar phenolic condensation products. By this means the main body of the molded article is composed of the easily molded and hardened relatively cheap bituminous compound and a highly polished outer surface is obtained thereon by a very small quantity of the much more costly phenolic condensation products.

Also by this invention imitation tile or other figured or colored surfaces may be easily produced on the molded article simply by printing or coloring as desired the paper which is impregnated with the bakelite or other synthetic resin and which is molded into the surface of the molded article as described hereinafter.

Further objects and advantages of the present invention will be apparent from the following description, reference being had to the accompanying drawings wherein a preferred embodiment of one form of the present invention is clearly shown.

In the drawings:

Fig. 1 illustrates a method of molding a plain flat panel of bituminous material with an outer casing of paper impregnated with a synthetic resin molded and cured in situ thereupon, according to this invention. The figure is a vertical section through the mold, the hydraulic press for forcing the mold sections together being omitted.

Fig. 2 illustrates an imitation tile molded panel made according to this invention.

Fig. 3 is a section through the molded panel of Fig. 2 showing the relatively thin outer casing comprising a fibrous sheet, such as paper, impregnated with bakelite or similar material and firmly bonded thereto by the molding process.

Like reference characters refer to like parts throughout the drawings.

Numeral 10 designates the lower section of the mold and 11 a removable polished face steel plate which fits down in the bottom of the mold cavity and by means of which the molded panel can be easily pressed out of the section 10 by means of knock-out pins (not shown) after the molding operation is completed. Numeral 12 is the upper section of the mold and is moved up and down by a suitable hydraulic press (not shown).

In one method of carrying out the process of this invention, a piece of paper first thoroughly impregnated with a synthetic resin (such as bakelite) by any well known method, is laid within the mold cavity directly upon and covering the steel plate 11. The required amount of hot plastic bituminous material, preferably comprising a mixture of gilsonite, a bituminous flux of lower melting point, a finely divided filler, and asbestos fiber and mixed according to the above mentioned prior application, is removed from a near-by kneading machine and placed in the mold cavity directly upon the impregnated paper 15. The upper mold section or plunger 12 is then immediately forced down by the hydraulic press upon the mass of hot plastic material, causing it to spread out and completely cover the paper 15 which is thereby smoothed out and pressed into tight contact with the bottom wall of the mold cavity. Of course the thickness of the panel 16 is determined by the amount of plastic material inserted into the mold. The mold section 10 is then heated by a suitable heating fluid passed through the passages 9 and the hydraulic pressure remains upon the plunger 12 for a sufficient length of time to properly cure the bakelite in the impregnated paper 15 under that heat and pressure to render it hard and insoluble.

The length of time and the temperature and pressure used may vary depending on the thickness of the impregnated paper 15 containing the bakelite material to be cured. With a temperature of 350° F. and with a panel such as shown, the internal pressure within the molded material should be at least 600 lbs. per square inch and the length of time required to properly cure the bakelite is about five minutes. After the bakelite material is properly cured, cooling fluid is passed through the passages 8 and 9 to quickly cool the mold sections and cause the hardening of the bituminous material 16 while the hydraulic pressure remains on.

On removal from the mold the paper 15 will be found to be bonded to the hardened bituminous material 16 and an exterior smooth, hard, polished coating of bakelite is obtained upon the molded panel. The paper itself prevents the bituminous material from being forced during molding through the outer skin of bakelite at any point and so marring the finished outer surface. In the finished panel the fibres of the paper being embedded in the hardened material aid in strengthening and hardening the surface thereof. Preferably a strong relatively thick grade of impregnated paper is used so that it will lie smoothly upon the bottom of the mold cavity and will not tear when the hot bituminous plastic material is forced down thereupon by the plunger 12.

In a second method of carrying out the process of this invention, the bituminous material is first preformed in the mold by the plunger 12 without the impregnated paper thereon. This preformed panel is then removed from the mold, the impregnated paper placed in the bottom of the mold on the steel plate 11, the preformed panel replaced in the mold, and the molding process repeated as described above for the first method. An important advantage of this second method is that very thin impregnated paper may be used since in this method the hot plastic material does not slide or travel over the surface of the paper when the plunger 12 descends thereupon and hence there is no tendency to tear or wrinkle the paper during molding.

When this second or preforming method is used, instead of inserting the impregnated paper in the mold it may be applied upon the preformed panel by a suitable adhesive means, such as bakelite varnish, and permitted to dry before completing the curing of the bakelite material as described hereinabove. Or the impregnated paper may be held in place upon the preformed panel by turning and crimping the edges of the paper around the edges of the preformed panel. In both of these cases the finished panel may be provided with a bakelite finish on its edge surfaces as well as on its face, which may be desired in some cases.

Fig. 2 illustrates an imitation tile panel. The impregnated paper itself may be of any desired color, such as dark brown, and the lines 20 drawn or printed thereon in black or other colored ink. A coating of transparent bakelite varnish may be applied over the lines 20 and permitted to dry before the paper is put into the mold. The finished panel will then show the background color and the lines 20 through the thin outer coating of bakelite. Instead of the imitation tile design shown, the impregnated paper may be printed with any desired ornamental design or figure and transparent bakelite used thereover. Such design or figure will then appear on the finished panel but will be embedded under a coating of transparent bakelite and hence will not wear off. Even though the outer bakelite varnish coating upon the printed design be omitted, it has been found that the bakelite in the impregnated paper will flow outwardly during the curing process and form a coating exterior to the printed design.

In the above description wherever the material "bakelite" is mentioned any similar synthetic resin or phenolic condensation product may be substituted therefor.

While the form of embodiment of the present invention as herein disclosed, constitutes a preferred form, it is to be understood that other forms might be adopted, all coming within the scope of the claims which follow.

What is claimed is as follows:

1. As a new article of manufacture, a molded body of a bituminous material having a relatively thin outer casing comprising a fibrous sheet containing synthetic resin molded and cured in situ upon the bituminous material.

2. As a new article of manufacture, a body consisting of a bituminous compound, including gilsonite, a bituminous flux of lower melting point, a finely divided filler and asbestos fiber, and a relatively thin outer casing on said body comprising a smooth fibrous sheet impregnated with synthetic resin and firmly bonded to said body by being molded thereto under heat and pressure.

3. As a new article of manufacture, a main body portion molded from a bituminous compound and having a relatively thin outer casing comprising a fibrous sheet impregnated with synthetic resin and firmly bonded to said bituminous body by being cured in situ thereupon under heat and pressure.

4. As a new article of manufacture, a main body portion molded from a bituminous compound and having an outer casing comprising an ornamented sheet of fibrous material impregnated with synthetic resin molded and cured in situ upon said bituminous body.

5. As a new article of manufacture, a main body portion molded from a bituminous compound, and having an outer casing comprising a sheet of paper having a design printed thereupon and impregnated with a transparent synthetic resin and molded and cured in situ upon said bituminous body under heat and pressure.

6. As a new article of manufacture, an ornamented molded panel comprising: a main body portion of bituminous material and a relatively hard decorative outer casing molded and cured in situ upon said bituminous material, said casing comprising a fibrous sheet having color contrast ornamentations thereupon embedded under a thin layer of transparent synthetic resin.

In testimony whereof I hereto affix my signature.

HARVEY D. GEYER.